United States Patent
Rothschild (10) Patent No.: US 8,914,921 B2
(45) Date of Patent: Dec. 23, 2014

(54) INTERFACE FOR ATTACHING BED LEGS TO BED BASE TUBES AND BED FRAME ANGLE IRONS

(76) Inventor: Philippe Max Rothschild, Clamart (FR)

(*) Notice: Subject to any disclaimer, the term of this patent is extended or adjusted under 35 U.S.C. 154(b) by 171 days.

(21) Appl. No.: 13/574,614

(22) PCT Filed: Jan. 21, 2011

(86) PCT No.: PCT/IB2011/050284
§ 371 (c)(1),
(2), (4) Date: Jul. 22, 2012

(87) PCT Pub. No.: WO2011/095909
PCT Pub. Date: Aug. 11, 2011

(65) Prior Publication Data
US 2012/0297538 A1    Nov. 29, 2012

(30) Foreign Application Priority Data

Feb. 3, 2010 (FR) .................................. 10 00421

(51) Int. Cl.
*A47C 19/00* (2006.01)
*F16B 12/54* (2006.01)
*A47C 19/02* (2006.01)

(52) U.S. Cl.
CPC .............. *F16B 12/54* (2013.01); *A47C 19/005* (2013.01); *A47C 19/022* (2013.01); *A47C 19/024* (2013.01)
USPC ..................................... 5/282.1; 5/285; 5/310

(58) Field of Classification Search
USPC .......... 5/200.1, 201–203, 205, 207–209, 218, 5/279.1, 282.1, 285, 238, 286, 310, 311
See application file for complete search history.

(56) References Cited

U.S. PATENT DOCUMENTS

| | | | |
|---|---|---|---|
| 2,907,054 A | | 10/1959 | Ward |
| 3,744,066 A | | 7/1973 | Falivene |
| 5,477,571 A | * | 12/1995 | Roggenkamp et al. ............ 5/310 |
| 7,219,378 B2 | * | 5/2007 | Polevoy et al. ................ 5/200.1 |
| 7,503,529 B2 | * | 3/2009 | Bartelsmeyer et al. ..... 248/125.9 |
| 7,690,058 B1 | * | 4/2010 | Dwyer et al. ..................... 5/310 |

FOREIGN PATENT DOCUMENTS

FR    2 780 113 A1    12/1999
FR    2 862 503 A1    5/2005

OTHER PUBLICATIONS https://web.archive.org/web/20101113041409/http://www.thesleepshop.com/store/pc/G10-Deluxe-Bed-Riser-p647.htm, Nov. 13, 2010 (date according to web.archive.org).
International Search Report, Apr. 18, 2011, from International Phase of the instant application.
English Translation of International Preliminary Report on Patentability Chapter I, Sep. 18, 2012, from International Phase of the instant application.
English Translation of the Written Opinion of the International Search Authority, Sep. 12, 2012, from International Phase of the instant application.

* cited by examiner

*Primary Examiner* — Nicholas Polito
*Assistant Examiner* — Richard G Davis
(74) *Attorney, Agent, or Firm* — Jackson Patent Law Office; Jerome Jackson (57) ABSTRACT

An attachment interface is configured to mount a bed leg. The attachment interface includes a base having a support platform and a guiding surface; an abutment; and a helical screw defining an axis oriented at a right angle to the abutment. The helical includes an actuation wheel, and threads positioned under the support platform. A mobile member is configured to move relative to the abutment, the mobile member defining a sliding surface configured to contact the guiding surface of the base.

12 Claims, 6 Drawing Sheets

INTERFACE FOR ATTACHING BED LEGS TO BED BASE TUBES AND BED FRAME ANGLE IRONS

CROSS-REFERENCE TO RELATED APPLICATIONS

A prior application was filed with the French Patent Office (INPI) by the same inventor: application No. FR10/00421 on Feb. 3, 2010, and the corresponding international application No. PCT/IB2011/052884, on Jan. 21, 2011.

STATEMENT REGARDING FEDERALLY SPONSORED RESEARCH OR DEVELOPMENT

Not applicable

REFERENCE TO SEQUENCE LISTING A TABLE OR A COMPUTER PROGRAM LISTING COMPACT DISC APPENDIX

Not applicable

BACKGROUND OF THE INVENTION

1. Field of the Invention

The invention relates to an attachment interface, of a type comprising a support platform fitted with a laterally setting flange, designed to allow, viz. to facilitate and to improve the mounting of bed legs, fitted with standard fasteners, onto square/rectangular cross-section tubular bed bases, or onto L-shaped angle irons making up the North-American type, metallic, bed base support structures.

2. Description of Related Art

A device of the prior art, the subject of patent No. FR2862503, provides for vertical three-step clamping of tubes: the lowering, on both sides of a tube, of a U-shaped flange, the vertical sides thereof being laterally fitted with racks, onto a laterally serrated block forming a counter-rack; the introduction of the ensemble—U-shaped flange+serrated block—in a vertical tube clamping interface and, last, the clamping by a rotating movement of the bed leg fastener within a threaded recess arranged at the bottom of the serrated block, whereby the top horizontal part of the bed leg comes to rest upon the vertical clamping attachment interface.

A second vertical tube clamping method, the subject of patent No. FR2912477, provides for vertical tube clamping through a bet rod driven by the rotating movement of the bed leg being installed. Its implementation takes necessarily place in three steps; to begin with, the height adjustment of a threaded recess, integral with the bent rod and designed to receive the upper bed leg fastener threads; next, the mounting of the unit onto the tube and the height adjustment and angle positioning of the tube clamping bent rod; and, last, the clamping of the ensemble leg/interface/tube.

Patents No. FR2862503 and FR2912477 provide, second, a lateral setting of tubes, in the first case, by means of symmetrical steps, arranged at the top of the vertical clamping interface, in a centered manner with respect to the U-shaped flange and with each couple thereof corresponding to a defined tube width; in the second case, by means of a lateral tube setting device, made up of a reversible chock which may be inserted into recess, the number thereof being necessarily limited.

The device according to patent No. FR2862503 has the drawback of spilling out in an unsightly and dangerous manner on the circulation space surrounding the bed.

The <<clamp>> arrangement adapted on patents No. FR2862503 and FR2912477 is a source of weakness in that it renders interdependent, first, the stability tube/attachment interface stability and, second, the stability of the bed leg attachment, both attachments being exposed to shock and vibration induced rotary motions.

The devices according to French patents No. FR2862503 and FR2912477 present the drawback of being only able to fit out square/rectangular cross-section tubes and not bed base supporting L-shaped angle iron structures.

These metallic structures are fitted out with various leg assembly attachment interfaces, essentially tubular, which only allow for mountings into dowels, wing nuts or directly into tubes which lack robustness and rigidity.

The device according to U.S. Pat. No. 5,477,571 is meant to make up for these drawbacks by allowing for the addition of a specific interface, welded and bolted to the ending of a tube acting as a leg and, which can only be installed onto lateral angle irons.

Consequently, the device cannot be installed on L-shaped iron angles laid out transversely, the angles and, as a result, the horizontal flanges of which being positioned at the top. The installation of midpoint legs on large-size structures cannot, accordingly, be envisaged. The installation of the device implies, furthermore, the use of a tool.

Finally, the use of a device according to U.S. Pat. No. 5,477,571 excludes any freedom of choice of bed legs, inasmuch as the attachment device is intrinsically part of each leg.

SUMMARY OF THE INVENTION

The device according to the invention, an attachment interface of the type comprising a support platform provided with a lateral clocking flange, makes up for the limitations inherent to these various devices of the prior art.

It provides, without resorting to tools, for the setting/clamping, both lateral and vertical, of tubes and L-shaped angle irons, resting, directly or indirectly, upon the support platform, through the sole actuation of a helical screw, laid out orthogonally to the lateral tube and angle iron setting flange, this actuation determining indirectly the lowering of an mobile interposed setting/clamping angle iron.

Figure 1:
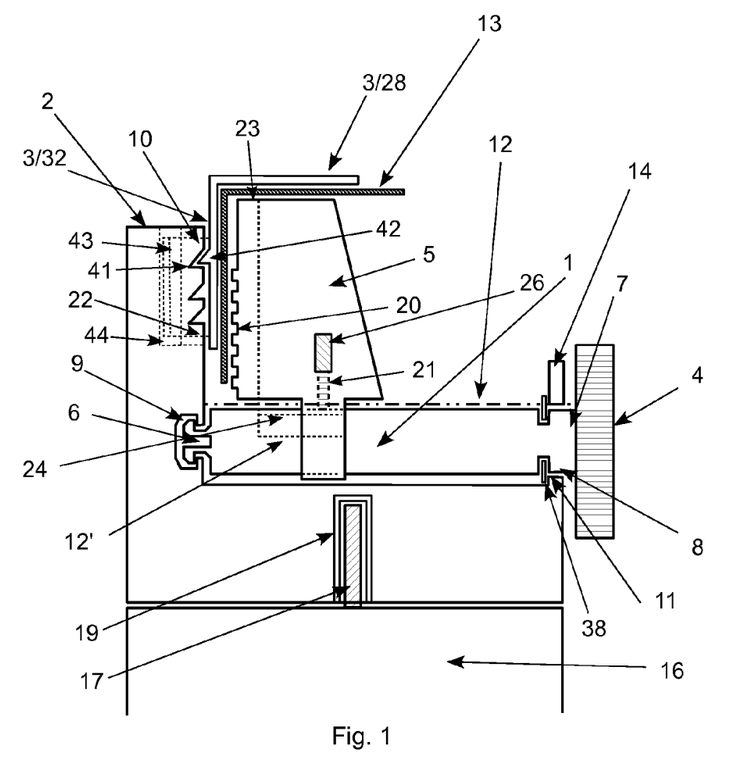
FIG. 1 represents a lateral cross-section plan view of such a device.
Figure 6A:
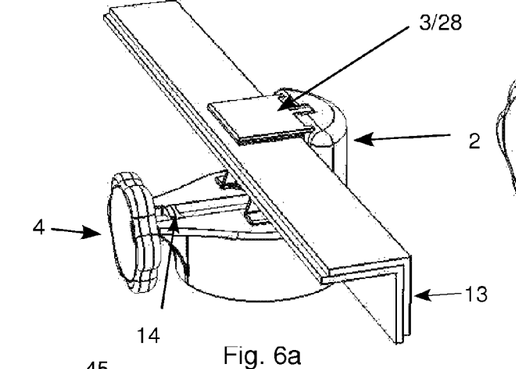
FIG. 6a represents such an attachment interface mounted onto two L-shaped cross angle irons (13), overlapping at the centre of a US type bed frame support structure, and, in particular, the horizontal flange (3/28) of the mobile interposed angle iron, the lateral setting flange (2) and the actuator hand wheel (4), the radial positioning helical screw shaft bearing (14) within the interface base wall (11).
Figure 6B:
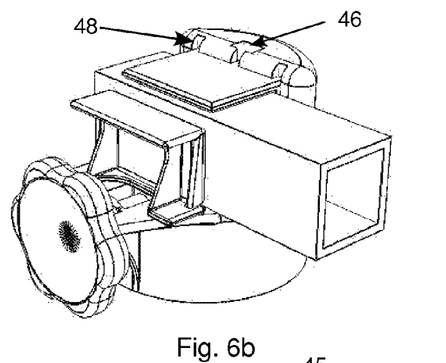
FIG. 6b represents such an attachment interface mounted onto a square cross-section tube, on which appear the recess (44) of the rigid attachment which is integral with the mobile, interposed, L-shaped angle iron.
Figure 6C:
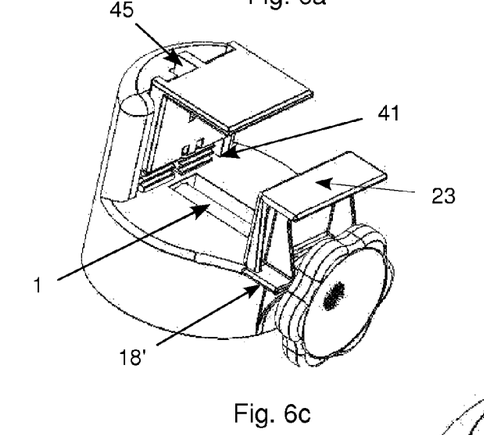
FIG. 6c represents such an attachment interface prior to being mounted and, in particular, the helical screw (1), stabilizing and sliding bearing pads (18'), the upper horizontal setting surface (23) of the clamping/setting element, the rigid tie (43) integral with the L-shaped mobile interposed angle iron.
Figure 6D:
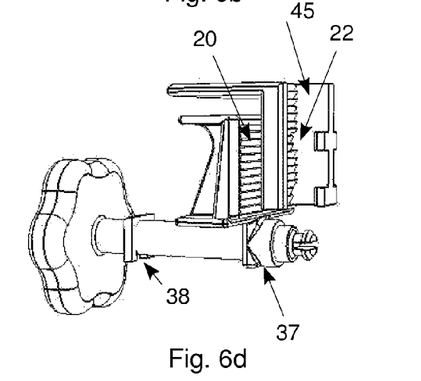
FIG. 6d represents the actuating mechanism of the clamping element of such an attachment interface with, in particular, a fork shaped axial stop (38) and, meshed in on the helical screw (1), the threaded base (37) of the clamping element extending axially beyond its threaded portion, prolonged by a threaded extension (37').

The embodiments of a bed base supporting square/rectangular cross-section tube and L-shaped angle iron setting facility, both lateral and vertical, according to FIGS. 1 and 6d, ensure a versatility of use and a great ease of assembly/disassembly, as well as great insensitivity to shocks and vibrations of the junction between leg/attachment interface and tubes/L-shaped angle irons.

The vertical bed base tube setting mode, obtained through the interposition of a mobile angle iron made integral with the lateral setting flange, and resulting, after the lowering of the angle iron, in its locking into position by means of the thrust exerted by the bed frame tubes or supporting angle irons, via the actuating of a lateral jackscrew hand wheel, allows for the coverage of a tube height extension range not correlated with the interface base height.

Whatever the tube heights and the vertical angle iron flange widths, respectively, one provides for the installation of the bed leg attachment interface irrespective of whether the heights to be accommodated are uniformly spaced or not, by means ensuring the horizontal displacement movement conversion into a vertical clamping movement allowing for the optimisation of the attachment interface clamping/setting via the optimization of the degree of meshing engagement of inward and outward serrations, respectively.

This optimization is obtained, for an equal serration thickness and depth, first, by the maximization of the number of serrations by means of the laying out, side by side, of two ladder-like serration strips, staggered one against the other by a vertical <<base>> displacement (d), corresponding to half a serration thickness, laid-out on the lateral setting flange and on the mobile interposed angle iron, second, by an additional adjustment allowing for the closing of the minimum gap noticed between, first, the respective heights of the external horizontal serration planes laid out on one or on the two vertical serration strips on the mobile interposed angle iron, at the time when the latter rests upon the various tubes or L-shaped corner irons of the bed base supporting metallic structures and, second, the mating horizontal plane heights of the inward projecting serrations laid out, at the immediately lower level, on the lateral setting flange.

The interchangeability of the mobile interposed angle iron allows furthermore, for a given bed leg attachment interface, the design of mobile interposed angle irons dimensioned, viz. laid-out so as to be adapted to sets of specific tube or angle iron heights.

The flats laid out on the outward and inward slanted serration surfaces, respectively, provide additional safety with regard to the risks of becoming disengaged, should the bed legs be subjected to violent shocks, their height positioning on the serration defined lower part of the slanted planes, being contingent on the admitted minimum degree of meshing between, first, the inward projecting ribs on the lateral setting flange front and, second, the outward ribs on the mobile interposed angle iron.

An angular elasticity of the mobile interposed angle iron makes up for possible residual clearances, whereas the mobile interposed angle iron length allows obtaining pressure points acting as resistance points to the rotation/tilting of bed legs during the forward/backward motion of box-springs.

The initial square/rectangular cross-section tube or angle iron positioning on the supporting interface platform or on the upper horizontal part of the clamping/setting element, respectively, finds itself largely facilitated by the initial removal of the mobile interposed angle iron, to the extent that its inelastic T shaped tie may then be inserted, after the tube/angle iron positioning, within the vertically laid-out recess, in a set back position relative to the setting flange front and will hence be able to slide vertically downward, and end up resting on the square/rectangular cross-section tube or the L-shaped angle iron, in preparation of, and at the time of the clamping operation initiated by the helical screw activation.

BRIEF DESCRIPTION OF THE FIGURES

By way of illustration, drawings are enclosed, which show, without limitation, such a square/rectangular cross-section tube or L-shaped angle iron, lateral and vertical clamping/setting device of a bed leg attachment interface.

FIGS. 4a, 4b, and 4c represent plan views of the lateral setting flange (2/10) as well as of the external and internal faces of the mobile, interposed, L-shaped angle iron L (3/32).

FIGS. 4d and 4e represent, as a variant, a frontal plan view of the lateral setting flange (2/10) and of the external serrated side of the mobile, interposed, L-shaped angle iron (3/32).

FIGS. 6a to 6e represent three-dimensional views of a bed leg attachment interface for their mounting onto rectangular shaped slatted bed bases, or onto L-shaped angle irons of a box mattress supporting metal structure, of the type comprising a support platform fitted out with a lateral setting flange.

DETAILED DESCRIPTION OF EXEMPLARY EMBODIMENTS OF THE INVENTION

According to a first feature of an exemplary device relating to an attachment interface for the mounting of bed legs onto square/rectangular cross-section tube frames, or on bed base supporting L-shaped angle iron structures, the attachment interface being of the type comprising a support platform resting upon a base and a lateral setting flange, comprising moreover, first, a helical screw a helical screw mounted rotatably free in a recesses made respectively in and perpendicular to the surface of the lateral setting flange front and to a wall of the interface, the helical screw comprising at least an actuation hand wheel laid out at its end beyond the interface base wall and, second, a mobile element, the upper part of which, opposite the lateral setting flange ensuring the horizontal clamping/setting of square/rectangular cross-section tubes and of L-shaped angle irons, forms a grip jaw driven by helical screw meshing and maintained in an upright position, during its forward and backward movement, by sliding surfaces moving alongside guiding surfaces of attachment the interface base, the bed leg mounting means, being fitted out with a helical screw rotably mounted within recesses laid out, respectively, within and perpendicular to, first, the lateral setting flange front, and, second, to a diametrically opposed wall of the interface base, in order for the thread crest to be always positioned beneath the support platform under surface level, the platform being subdivided into two parts laid out on both sides of the vertical plane passing through the helical screw axis, the helical screw being fitted out with at least one axial stop.

According to another feature of an exemplary device, the attachment interface comprises, associated to the mobile, lateral clamping/setting element, a vertically clamping/setting element in the form of a mobile interposed L-shaped angle iron fitted with the means of converting the horizontal displacement and clamping movement into a vertical clamping movement and preferably endowed with angular elasticity, the vertical flange being kept linked with, and guided while moving vertically alongside the lateral setting flange front, while the horizontal flange, is lead to rest upon the horizontal surfaces of the square/rectangular cross-section tubes or upon the horizontal flanges of the L-shaped angle irons when the mobile lateral clamping/setting element translates the rectangular cross-section tubes/L-shaped angle irons towards the lateral setting flange front, so as to have them clamp simultaneously the vertical flange of the mobile interposed L-shaped angle iron.

According to another feature of an exemplary device, the means of converting the horizontal translation movement of the mobile lateral clamping/setting element into a vertically setting movement of the mobile interposed L-shaped angle iron, are made up, first, on the lateral setting flange front, of at least one couple of vertical strips, comprising horizontal inward projecting same thickness serrations, defining in the lower part thereof, slanted planes, and, second, on the opposite side, of vertical strips of horizontal outward serrations, having the same profile and thickness as the inward projecting serrations, projecting from the external vertical side of the mobile interposed L-shaped angle iron, the slanted planes of which, provided for on the upper part of their surfaces, being in sliding support on the lower slanted planes as defined by the mating lower surfaces of the inward projecting serrations laid out on the opposite side, above, to form a variable number of sliding meshes, in line with the degree of overlapping between the mobile interposed L-shaped angle iron and the lateral setting flange front and in that a vertical staggering is provided between serration strips of a same couple of strips, laid out on the lateral setting flange front and on the mobile interposed L-shaped angle iron, of lesser value than the serration pitch, so as to optimize the degree of meshing of outward and inward projecting serrations, respectively.

According to another feature of an exemplary device, horizontal setting flats allowing for a lateral offset between the two successive slanted surfaces of every serration, are laid out in the intermediate part of the slanted, outward and inward projecting serrations, respectively, fitted out with locking means, so as to define a stop point ensuring locking in case of fortuitous loosening.

According to another feature of an exemplary device, the mobile interposed L-shaped angle iron incorporates, at least on part of its height, on its external side, opposite the lateral setting flange front, a rigid T shaped tie which, first, allows for the linking of the mobile interposed L-shaped angle iron through the insertion of the tie into a vertical recess, whose horizontal depth is greater than that of the T-shaped tie cross bar, the T-shaped tie being arranged within the lateral setting flange, while projecting from its front, as well as, at its top end, from the setting flange and, second, the sliding, height wise positioning of the mobile interposed L-shaped angle iron, so as to allow, besides the sliding, a forward/backward translation during the mated translation of the slanted plane parts provided for on the flange and the mobile interposed L-shaped angle iron.

According to another feature of an exemplary device, the attachment interface comprises, associated with a lateral clamping/setting element, a vertically setting element in the form of an interposed L-shaped angle iron, the lateral setting front and, opposite, the external side of the mobile interposed L-shaped angle iron, being fitted out with mating serrations, running parallel with the downward pressure exerting horizontal surface of the interposed L-shaped angle iron, the serrations having e.g. a dissymmetric profile comprising horizontal surfaces which inhibit the upward movement of the interposed L-shaped angle iron and, accordingly, of the square/rectangular cross-section tubes/bed base supporting angle irons.

According to another feature of an exemplary device, the surfaces of the mobile lateral clamping/setting element opposite the square/rectangular cross-section tube surfaces and mobile interposed L-shaped angle iron surfaces, laid-out vertically, and the surfaces of the interposed L-shaped angle iron flanges, laid-out horizontally, respectively, define square/rectangular cross-section tube frame clamping surfaces and L-shaped angle iron supporting surfaces, respectively, whereby the vertical surface of the mobile lateral clamping/setting element presents a greater height than the width of the vertically laid-out L-shaped angle iron flange, so as to prevent the resting of the edge of the angle iron flange on one of the two support platform parts.

According to another feature of an exemplary device, the thrust surface of the mobile lateral clamping/setting element in contact with square/rectangular cross-section tube frames or with angle irons is fitted out with a concentric relief consisting preferably in square cross-section serrations, having, preferably, as their centre, the helical screw axis, a diminishing depth, at its highest at the periphery of the mobile lateral clamping/setting element, at its lowest near the helical screw, so as to increase the efficacy of the thrust exerted upon square/rectangular cross-section tube frames and on L-shaped angle irons.

According to another feature of an exemplary device, the mobile lateral clamping/setting element forming a grip jaw, comprises, at the low end of its thrust surface, symmetrically laid out on both sides of the helical screw axis, supporting slides resting upon the parts of the tube frame support platform, designed to counter the vertical thrust exerted by the horizontally laid out iron angle flange upon its horizontal, vertically setting surface and to mitigate the risk of lateral tipping of the mobile lateral clamping/setting element, owing to the very thrust it exerts upon the square/rectangular cross-section tube frames/angle irons.

According to another feature of an exemplary device, the parts of the square/rectangular cross-section tube frame support platform, which are laid out on both sides of the vertical plane passing through the mobile lateral clamping/setting element axis of the actuating helical screw, are inscribed in a convex shape that extends, laterally, on the side of the actuating hand wheel, beyond the attachment interface base, in order to extend the path followed by the vertically stabilizing slides of the mobile lateral clamping/setting element, and the lateral clamping/setting element base has, on the side of the hand wheel, a horseshoe like shape so as to be able to move past the helical screw shaft bearing, thus allowing for the accommodation of large size square/rectangular cross-section tubes.

According to another feature of an exemplary device, the interface is fitted out with means of maintaining the clamping and setting element in a vertical position and parallel to the lateral setting flange during its forward and backward move, these means comprising either, slides arranged projecting, laterally, on the clamping/setting element, sliding within notches laid out on the edge of both parts of the square/rectangular cross-section tube supporting surface and sliding within cooperating elements on the under-surface of the square/rectangular cross-section tube supporting surfaces, these surfaces opposing, second, the vertical pressure exerted by the angle iron horizontal flange on the upper horizontal vertical setting surface of the clamping/setting element, or extended vertical stabilisation slides, sliding on the square/rectangular cross-section tube support platforms, as well as an extension of the clamping/setting element base, towards the lateral setting flange, so as to have it rest, beyond its threaded part, upon the top of the helical screw threads.

According to another feature of an exemplary device, the mating serrations laid out, on the vertical lateral setting flange surface and on the external vertical side of the mobile interposed angle iron are subdivided, vertically, into separated strips, first, on the lateral setting flange, by a vertical rib and a sliding slot, second, on the external vertical side of the mobile interposed angle iron, by a slide recess and a fastener, e.g. a clip fastener.

According to a last feature of an exemplary device, the axial stopping of the helical screw is insured by a clip fastener penetrating inside the lateral setting flange, as well as, preferentially, by an axial stopping fork mounted radially within a helical screw groove and tangentially to the internal side of a vertical wall, integral with the attachment interface base, while, preferentially, the clamping/setting element position, as against the helical screw length is lockable through the pressure exerted onto the helical screw periphery by the tip of a locking screw, preferentially activated by an adjusting knob, its recess being threaded within the body, planned to be hollow, of the clamping/setting element, open towards the activation knob, in a plane orthogonal to the helical screw axis, in order to facilitate its access and activation by the user.

FIG. 1 shows, in a lateral cross-section plan view, such a device, including the helical screw (1), the tube and L-shaped angle iron setting flange (2), the square/rectangular cross-section tubes support platform level (12), laid out symmetrically, on each side of the helical screw (1) and recesses (24). A cooperating sliding surface (12') is on the under-surface of the tube support platform (12). A helical screw (1) has ends (6) and (7). Positioning recesses (9) and (8), of ends (6) and (7), are laid out within the vertical wall (10) of the lateral setting flange (2). Within that, diametrically opposed (11) from the interface base having globally an L shape, is a clamping/setting element (5), an upper part of a helical screw shaft bearing (14) and an actuator hand wheel (4). A threaded rod (17), of bed leg (16), is screwed into a threaded recess (19). Triangular shaped outward (42) and inward (41) projecting serrations, respectively, are on a mobile, interposed, L-shaped angle iron (3) and on the lateral setting flange (2) front (10). A rigid T shaped tie (43) is on the mobile interposed angle iron (3). A vertical recess (44) allows for the sliding of the rigid T shaped tie cross-bar (43). The vertical (32) and horizontal (28) flanges are on the mobile interposed angle iron (3). Raised serrations with square cross-section edges (20) are on the clamping/setting element (5). A locking screw (21) is for the helical screw (1) actuated by an actuator hand wheel (4). A vertical setting surface (23) is on the clamping/setting element (5). The vertical setting angle iron (3) is mobile. An axial stop fork (38) is for the helical screw (1). A threaded base (37) of the clamping element is axially extended beyond its threaded part, by a bored extension (37').

Figure 2A:
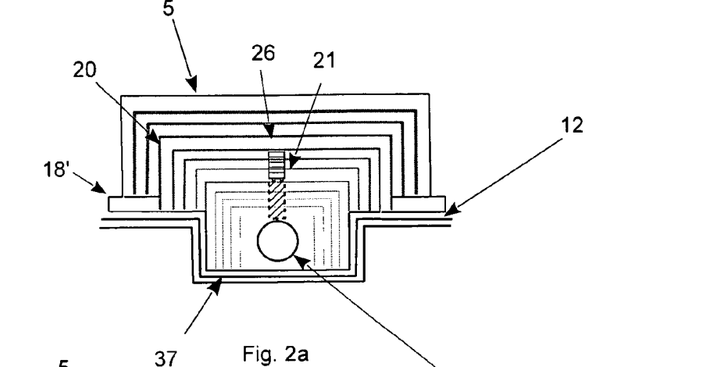
FIG. 2a represents a cross-section frontal view of a clamping/setting element (5), FIGS. 2c, 2d, associated to FIG. 2e, show sectional frontal plan views according to dotted and dashed lines A-A' and B-B'.

FIG. 2a shows, in a cross-section frontal view, the clamping/setting element (5). An upper part of element 5 exerts a thrust on the tubes/angle iron flanges and is maintained in a horizontal position during its forward/backward movement, by means of vertical end edges of the tube support platform (12), which keep the lateral faces of the clamping/setting element (5) base (37) in an upright position when the clamping/setting element is actuated by the helical screw (1), by sliding, vertically stabilizing bearing pads (18'), extended in the direction of the actuator hand wheel (4).

FIG. 2b represents a view from above of part of the helical screw (1) equipped with an axial stop fork (38) laid out tangentially to the internal side of the vertical interface base wall (11), and an actuator hand wheel (4). Tube support platforms (12) are on both sides of the helical screw (1).

Figures 2C, 2D, 2E:
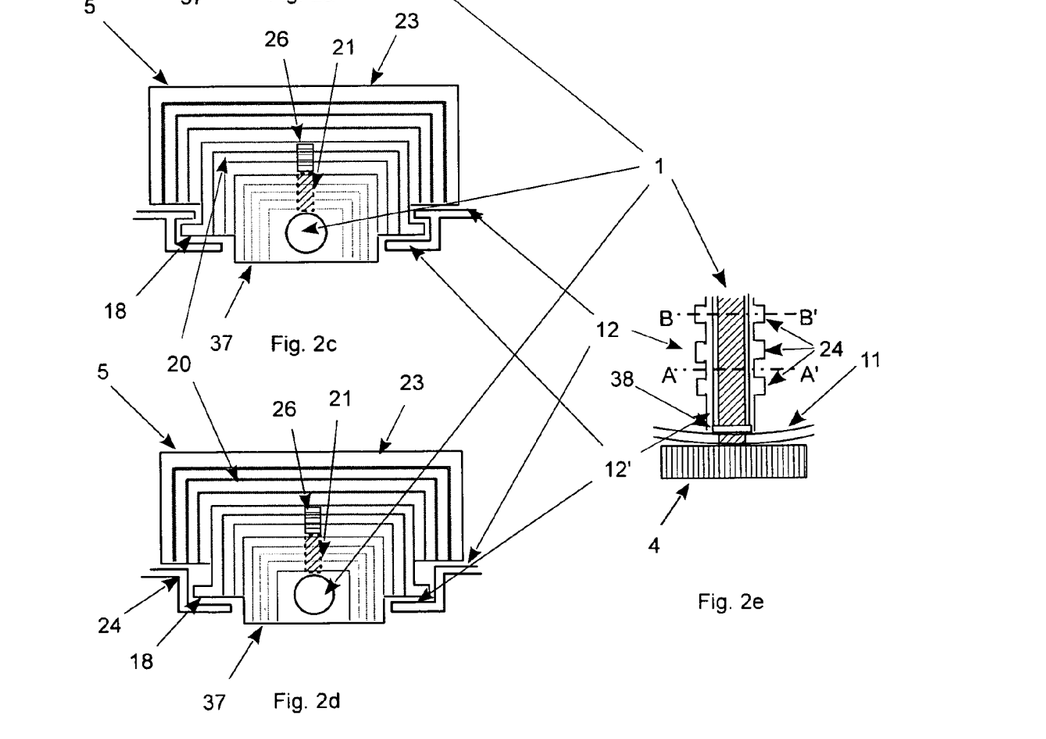

FIGS. 2c, 2d, associated with FIG. 2e, show sectional frontal plan views according to dotted and dashed lines A-A' and B-B', respectively, of the part of a clamping/setting element (5) resting upon the square/rectangular cross-section tubes/L-shaped angle irons, crossed, at its lower part, in the direction of its motion, by the helical screw (1). Raised concentric serrations (20), have as their centre the helical screw axis (1), a tapering depth, maximal at the clamping/setting element (5) periphery, minimal, close to the helical screw (1), parts of the tube support platform (12), symmetrically laid out in relation to the helical screw (1) parts of the square/rectangular cross-section tubes support platform. Recesses (24), regularly spaced out, enable for the installation of the clamping/setting element (5) by enabling the passing of sliding pads (18), laid out laterally, projecting from either side of its base (37). After its introduction into the space that separates the square/rectangular cross-section tube supporting interface platform parts (12), and during the forward and backward sliding of the clamping/setting element (5), its horizontal positioning is ensured by pads (18) which slide within under-surface cooperating elements (12') of the square/rectangular cross-section tube supporting surfaces (12).

Figure 3A:
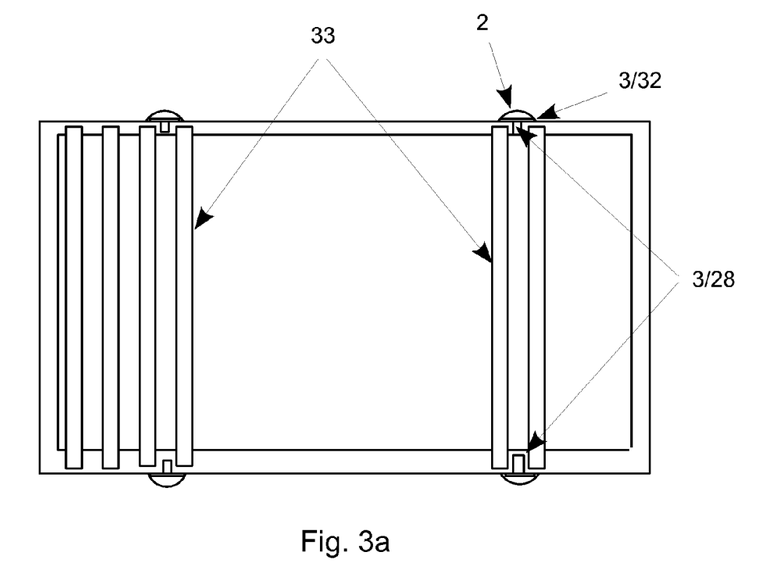
FIG. 3a represents a plan view from above, of the positioning of leg/attachment interface units on the siderails of a slatted bed base.

FIG. 3a shows, in a plan view from above, the positioning of leg/attachment interface units on the siderails of a slatted bed base, showing the lateral setting flanges (2), and the edges of the mobile interposed L-shaped angle irons (3/32), whose horizontal angle iron flanges are dimensioned so that they may be positioned between two adjacent slat holders (33).

Figure 3B:
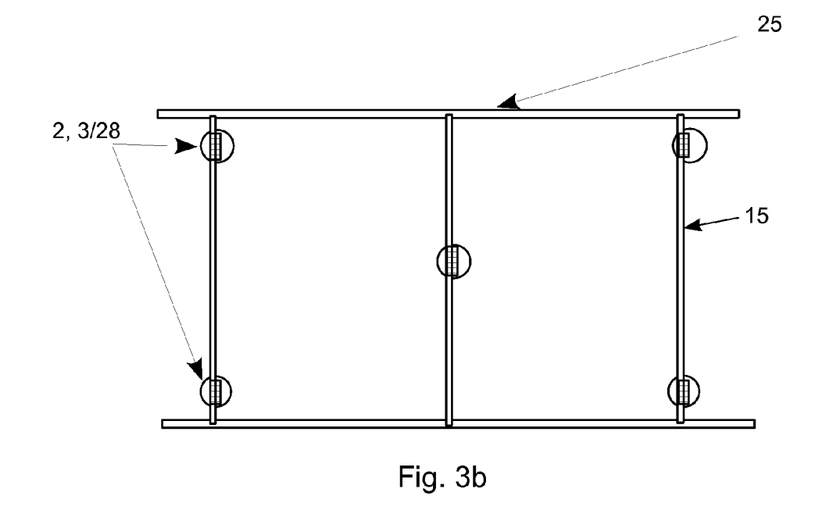
FIG. 3b represents a plan view, from above, of the positioning on cross rails (15) of leg/attachment interface units linking bed frame side rails (25) to build up a North-American type metallic support structure.

FIG. 3b shows, in a plan view, from above, the positioning on cross rails (15) of leg/attachment interface units linking bed frame side rails (25) to build up a North-American type metallic support structure, on which are shown lateral setting flanges (2), mobile, interposed, horizontal, L-shaped angle irons (3/28) gripping tightly from above the upper part of the horizontal flanges of the cross rails (15) and having widths approximately equal to those of the lateral setting flange (2).

Figure 4A:
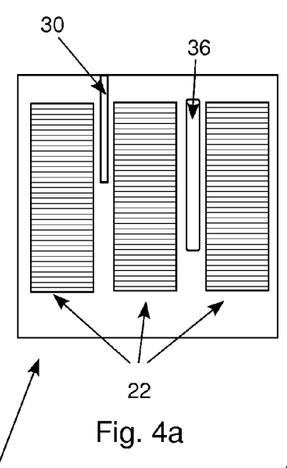
FIG. 4a represents a front view of the lateral setting flange (2/10) showing three vertical serrated strips (22), a vertical guiding rib (30) and a sliding slot (36) of a clipped fastener
Figure 4B:
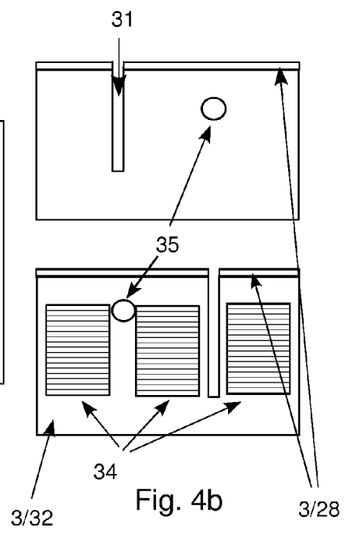
FIG. 4b represents views, internal, on the tube/angle iron side (above), and external, on the lateral flange side (at the bottom), respectively, of a mobile, interposed, L-shaped angle iron (3).
Figure 4C:
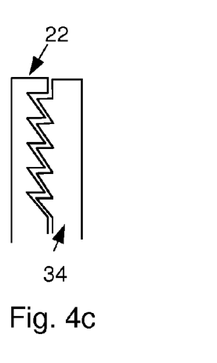
FIG. 4c represents a plan profile view, of the horizontal meshing of the vertical serrated strips (22) and (34), laid out, respectively, inward projecting, on the lateral setting flange (2).

FIGS. 4a, 4b, and 4c shows plan views of the lateral setting flange (2/10) as well as of the external and internal faces of the mobile, interposed, L-shaped angle iron L (3/32), whereby the lateral setting flange (2/10) as well as the external side of the mobile, interposed, L-shaped angle iron (3/32) are fitted out with toothed serrations (22).

FIG. 4a shows, in a front view, the lateral setting flange (2/10) showing three vertical serrated strips (22), a vertical guiding rib (30) and a sliding slot (36) of a clipped fastener.

FIG. 4b shows views, internal, on the tube/angle iron side (above), and external, on the lateral flange side (at the bottom), respectively, of a mobile, interposed, L-shaped angle iron (3). Iron (3) includes three vertical serrated strips (34), and also the horizontal flange edge (32) of the mobile, interposed, L-shaped angle iron (3), the sliding recess (31) of the vertical sliding rib (30) and a clipped fastener (35) provided for, sliding, in the sliding slot (36).

FIG. 4c shows, in a plan profile view, the horizontal meshing of the vertical serrated strips (22) and (34), laid out, respectively, inward projecting, on the lateral setting flange (2) and, projecting outward from the external side of the mobile, interposed, L-shaped angle iron (3). The respective upper horizontal and inclined surfaces of the asymmetrical meshing profiles of the serrated strips counter the rising of the mobile, interposed L-shaped angle iron (3), and accordingly, of bed base supporting square/rectangular cross-section tube/angle iron structures.

Figure 4D:
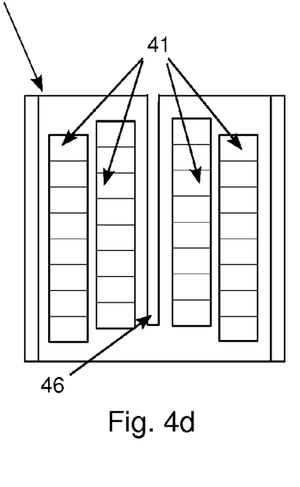
FIG. 4d represents two couples of vertical strips of triangular inward projecting serrations (41), laid out vertically, on the lateral setting flange (2/10), according to a regular zigzag pitch.
Figure 4E:
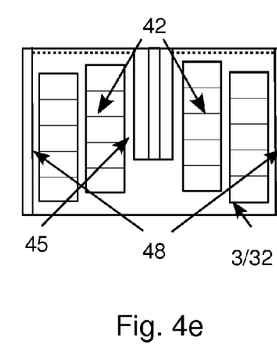
FIG. 4e represents two couples of vertical, triangular shape, outward serrations (42), laid out vertically on the external side of the mobile, interposed, L-shaped angle iron (3/32).

FIGS. 4d and 4e show as a variant, a frontal plan view of the lateral setting flange (2/10) and of the external serrated side of the mobile, interposed, L-shaped angle iron (3/32).

FIG. 4d shows two couples of vertical strips of triangular inward projecting serrations (41), laid out vertically, on the lateral setting flange (2/10), according to a regular zigzag pitch, laid out equidistant from a recess (44), the couples of serrated strips being staggered, one against the other, by a height equivalent to half a pitch, namely half a serration thickness.

FIG. 4e shows two couples of vertical, triangular shape, outward serrations (42), laid out vertically on the external side of the mobile, interposed, L-shaped angle iron (3/32), according to a regular, zigzag type pitch identical to the one shown on FIG. 4d, equidistant from a rigid T-shaped tie (43), the couple of serrated strips being staggered, one against the other, by a height equivalent to half a pitch (d), namely a half serration thickness, and staggered from the horizontal surface of the mobile, interposed angle iron (3/28), by a distance determined according to the square/rectangular cross-section tube/angle iron setting heights.

Also shown are vertical ribs (48) laid out laterally on the external side of the mobile, interposed, L-shaped angle iron (3/32), so as to be able to slide within the mated grooves laid out laterally on the lateral setting flange (2) front (10) shown on FIG. 4d.

Figure 4F:
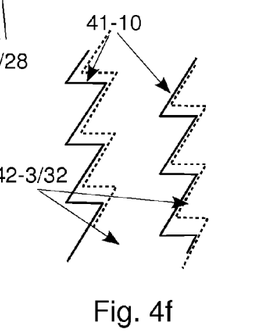
FIG. 4f shows a plan profile view, of the horizontal meshing of the two, vertically adjacent, asymmetrical series of triangular, ladder-like serrations (42), projecting outward from the vertical flange of the mobile.

FIG. 4f shows a plan profile view, of the horizontal meshing of the two, vertically adjacent, asymmetrical series of triangular, ladder-like serrations (42), projecting outward from the vertical flange of the mobile, interposed, L-shaped angle iron (3/32) and in sliding support contact with the slanted surfaces of asymmetrical, triangular, inward projecting serrations (41/10), also vertically adjacent and set in a ladder-like manner on the lateral setting flange (2) front (10). These two series of vertically adjacent serrations are staggered, one against the other, by a height equivalent to half a pitch (d), namely half a serration thickness.

Figure 4G:
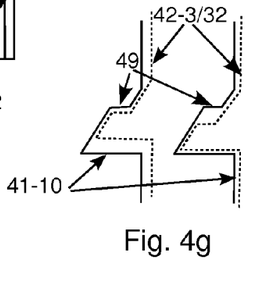
FIG. 4g shows, as a variant, on the left-hand sketch, a plane profile view, of partially meshed serrations, and meshed entirely on the right-hand sketch, having an asymmetric triangular profile.

FIG. 4g shows, as a variant, on the left-hand sketch, a plane profile view, of partially meshed serrations, and meshed entirely on the right-hand sketch, having an asymmetric triangular profile, laid out projecting (42) from the vertical flange of the mobile, interposed, L-shaped angle iron (3/32) and inward projecting on the lateral setting flange (2) front (10). The serrations, which all incorporate, on their slanted planes, a horizontal setting flat (49) form a stop which counters the angle iron rise in case of fortuitous loosening, as well as slanted planes of the inward serrations (45).

Figures 5A, 5B:
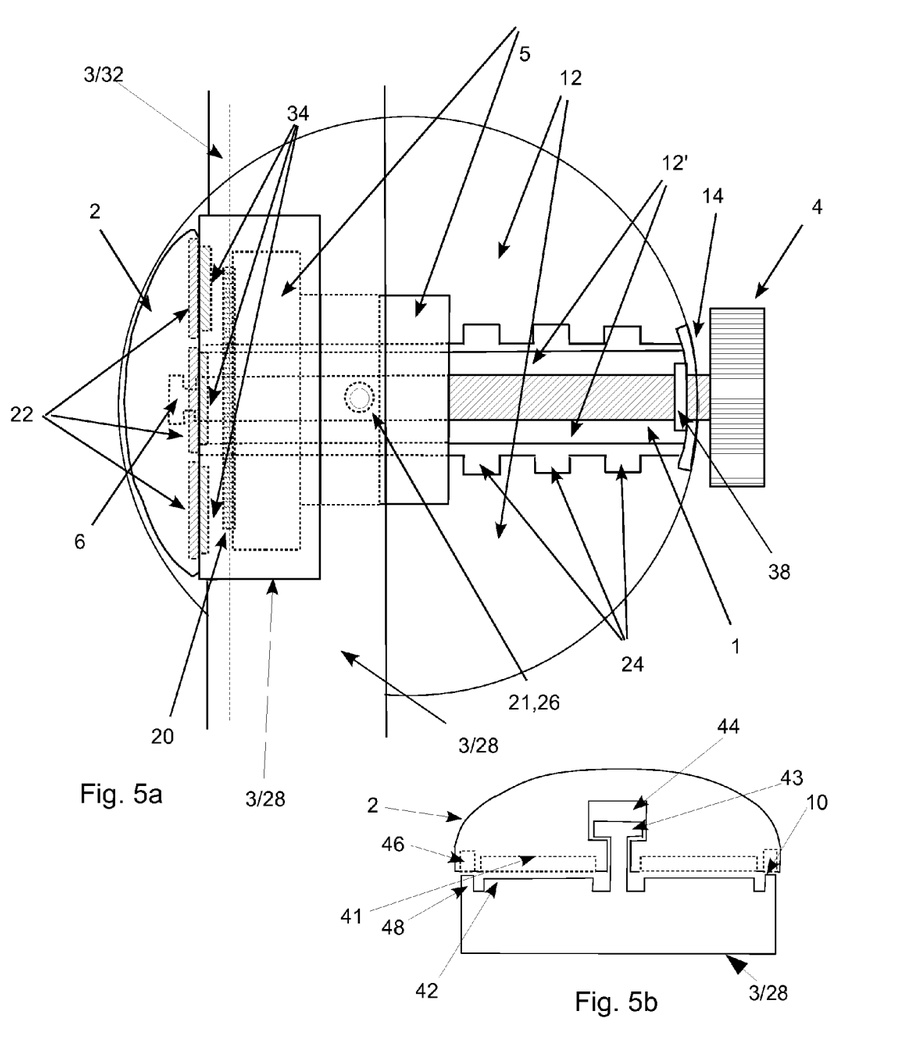
FIG. 5a shows a plane view, from above, of an attachment interface ensuring the clamping of the vertical flange (32) of a mobile, interposed, L-shaped angle iron (3) and the setting of its horizontal flange (28).
FIG. 5b shows a plane view, from above, of a mobile, interposed, L-shaped, angle iron (3), installed on the lateral setting flange (2) by means of a rigid, T-shaped tie, projecting from the external side of the mobile.

FIG. 5a show a plane view, from above, of the attachment interface clamping the vertical flange (32) of a mobile, interposed, L-shaped angle iron (3) and setting its horizontal flange (28). Shown are the lateral setting flange (2), the vertical serrated strips (22) on its surface, and those (34), on the opposite surface of the interposed angle iron (3), and the clamping/setting element (5). The concentric serrations (20) are on the clamping/setting element (5) front which rest upon the angle iron vertical flange (32). The locking screw (21) is actuated by the thumbwheel (26). The helical screw (1) is actuated by a hand wheel (4). The upper part of a helical screw shaft bearing (14) is on the attachment interface base. The square/rectangular cross-section tube support surfaces (12) are laid out on either side of the helical screw (1). The recesses (24) are for the introduction of lateral, sliding, projecting elements of the lateral clamping/setting element (5). The fork shaped axial stop (38), is inserted from above, tangentially to the internal side of the attachment interface base wall (11), into a circumferential groove provided for on the helical screw (1).

FIG. 5b shows, in plan view, from above, the mobile, interposed, L-shaped, angle iron (3), installed on the lateral setting flange (2) by means of a rigid, T-shaped tie (43), projecting from the external side of the mobile, interposed, L-shaped angle iron (3) and introduced through a junction groove into an equally T-shaped recess (44). Recess (44) is laid out internally, parallel to the lateral setting flange (2) front (10) and opening on the upper horizontal surface of the lateral setting flange (2), whereby the T-shaped recess crossbar (44) has a slightly greater depth than that of the triangular serrations (42), projecting from the mobile, interposed, L-shaped angle iron (3), so as to arrange for some clearance facilitating the introduction and the vertical positioning of the mobile angle iron (3).

Also shown are the grooves (46), the vertically sliding ribs (48) of the mobile interposed angle iron (3/28) alongside the lateral setting flange (2) front (10).

FIGS. 6a to 6e shows three-dimensional views of a bed leg attachment interface for mounting onto rectangular shaped slatted bed bases, or onto L-shaped angle irons of a box mattress supporting metal structure. The interface includes a support platform fitted out with a lateral setting flange.

FIG. 6a shows such an attachment interface mounted onto two L-shaped cross angle irons (13), overlapping at the centre of a US type bed frame support structure. FIG. 6a shows the horizontal flange (3/28) of the mobile interposed angle iron, the lateral setting flange (2) and the actuator hand wheel (4), and the radial positioning helical screw shaft bearing (14) within the interface base wall (11).

FIG. 6b shows an attachment interface mounted onto a square cross-section tube, on which appear the recess (44) of the rigid attachment which is integral with the mobile, interposed, L-shaped angle iron, vertical sliding grooves (46) laid out laterally to ensure the horizontality of the mobile interposed angle iron (3), the concave horseshoe-like part, (47), on the hand wheel side, of the clamping/setting element.

FIG. 6c represents an attachment interface prior to being mounted. FIG. 6c shows the helical screw (1), stabilizing and sliding bearing pads (18'), the upper horizontal setting surface (23) of the clamping/setting element, the rigid tie (43) integral with the L-shaped mobile interposed angle iron, laid-out internally to the lateral flange, and two vertical strips of inward projecting serrations (41) of the lateral setting flange.

FIG. 6d shows the actuating mechanism of the clamping element of an attachment interface including a fork shaped axial stop (38). Meshed in on the helical screw (1), is the threaded base (37) of the clamping element extending axially beyond its threaded portion, prolonged by a threaded extension (37'), in relief serrations (20) on that part of the clamping element which is in contact with the square/rectangular cross-section tubes or with angle irons flanges. FIG. 6d also shows represents a mobile interposed angle iron arranged opposite, comprising a rigid tie (43) and fitted out, on its inner surface, opposite the lateral, lateral setting interface flange, with meshing outward serrations (42).

Figure 6E:
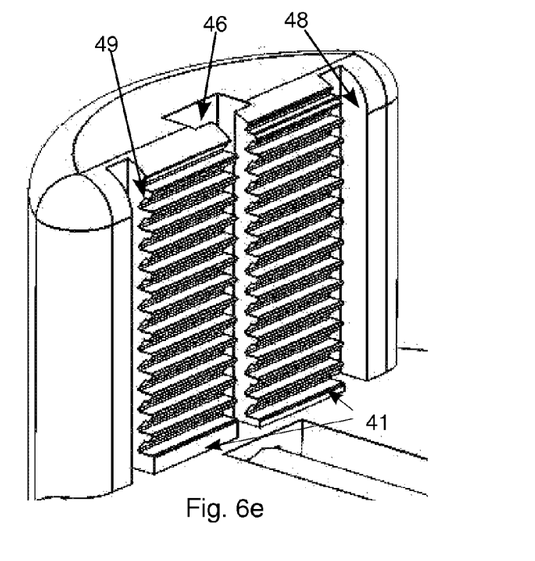
FIG. 6e represents an enlarged view of two vertical strips of inward projecting serrations (41), laid out in a ladder-like manner on the lateral setting flange and of which the slanted sliding surfaces comprise a horizontal setting flat (49).

FIG. 6e represents an enlarged view of two vertical strips of inward projecting serrations (41), laid out in a ladder-like manner on the lateral setting flange. The slanted sliding surfaces includes a horizontal setting flat (49), the recess (44) of the rigid tie integral with the L-shaped mobile interposed angle iron, as well as the lateral, vertically sliding mating rib grooves (46) of the mobile interposed angle iron.

The invention claimed is:

1. An attachment interface configured to mount a bed leg, the attachment interface comprising:
   a base including a support platform and a guiding surface;
   an abutment defining a major surface;
   a helical screw defining an axis oriented at a right angle to the major surface, the helical screw being rotably mounted, the helical screw including
      an axial stop,
      an actuation wheel, and
      threads between the actuation wheel and the abutment, the threads being positioned under the support platform; and
   a mobile member configured to move relative to the abutment, the mobile member defining a sliding surface configured to contact the guiding surface of the base.

2. An attachment interface according to claim 1 further including a mobile interposed L-shaped angle iron configured to convert a horizontal force into a vertical force.

3. An attachment interface according to claim 2 further wherein angle iron defines slanted planes configured to convert the horizontal force into the vertical force.

4. An attachment interface according to claim 3 further wherein the slanting planes are arranged in multiple column.

5. An attachment interface according to claim 2 wherein the angle iron includes a T shaped tie.

6. An attachment interface according to claim 1 further including an angle iron configured to fit between the abutment and the mobile member.

7. An attachment interface according to claim 6 wherein a dimension of the mobile member is greater than a dimension of the angle iron so as to prevent the angle iron from resting on the support platform.

8. An attachment interface according to claim 1 wherein the mobile member defines a concentric relief.

9. An attachment interface according to claim 1 further including supporting glides configured to inhibit tipping of the mobile member.

10. An attachment interface according to claim 1 further wherein the mobile member defines a horseshoe like shape.

11. A bed comprising:
    a rectangular section tube frame;
    a leg; and
    the attachment interface of claim 1, coupled between the leg and the rectangular section tube frame.

12. A bed comprising:
    a supporting L-shaped angle iron structure;
    a leg; and
    the attachment interface of claim 1, coupled between the leg and the supporting L-shaped angle iron structure.

* * * * *